United States Patent
Lin et al.

(10) Patent No.: US 10,439,829 B1
(45) Date of Patent: Oct. 8, 2019

(54) PHYSICAL UNCLONABLE FUNCTION CODE GENERATING METHOD AND PROVIDING APPARATUS THEREOF

(71) Applicant: Winbond Electronics Corp., Taichung (TW)

(72) Inventors: Lih-Wei Lin, Taichung (TW);
Chi-Shun Lin, San Jose, CA (US);
Seow Fong Lim, San Jose, CA (US)

(73) Assignee: Winbond Electronics Corp., Taichung (TW)

(*) Notice: Subject to any disclaimer, the term of this patent is extended or adjusted under 35 U.S.C. 154(b) by 0 days.

(21) Appl. No.: 16/264,698

(22) Filed: Feb. 1, 2019

(51) Int. Cl.
*H04L 9/32* (2006.01)
*H04L 9/08* (2006.01)
*G11C 13/00* (2006.01)

(52) U.S. Cl.
CPC .......... *H04L 9/3278* (2013.01); *G11C 13/004* (2013.01); *G11C 13/0059* (2013.01); *H04L 9/0869* (2013.01)

(58) Field of Classification Search
CPC ................... H04L 19/3278; G11C 13/0059
See application file for complete search history.

(56) References Cited

U.S. PATENT DOCUMENTS

| | | | |
|---|---|---|---|
| 9,653,161 B2 | 5/2017 | Yoshimoto et al. | |
| 9,811,689 B1 | 11/2017 | Tseng et al. | |
| 9,852,791 B1* | 12/2017 | Tseng | G11C 13/0007 |
| 9,948,471 B2 | 4/2018 | Katoh | |
| 2016/0148666 A1* | 5/2016 | Rosenberg | G11C 11/1673 365/158 |
| 2016/0301534 A1* | 10/2016 | Chen | H04L 9/3278 |
| 2018/0039784 A1* | 2/2018 | Hung | G06F 13/42 |
| 2018/0337777 A1* | 11/2018 | Shieh | G06F 3/062 |

* cited by examiner

*Primary Examiner* — Jason Crawford
(74) *Attorney, Agent, or Firm* — JCIPRNET

(57) ABSTRACT

A physical unclonable function code generating method includes: providing a plurality of non-volatile memory cell pairs including a first non-volatile memory cell and a second non-volatile memory cell; comparing an initial state of the first non-volatile memory cell with an initial state of the second non-volatile memory cell, and generating a first physical unclonable function code according to a comparison result of the state; calculating a formation ratio difference of a logical level in the first physical unclonable function code; and adjusting the formation ratio difference by interactively performing forming operations on the first non-volatile memory cell and the second non-volatile memory cell when the formation ratio difference is greater than or equal to a ratio threshold.

12 Claims, 4 Drawing Sheets

PHYSICAL UNCLONABLE FUNCTION CODE GENERATING METHOD AND PROVIDING APPARATUS THEREOF

BACKGROUND

Technical Field

The disclosure relates to a physical unclonable function (PUF) code generating method, and more particularly to a physical unclonable function code generating method using a resistive memory.

Description of Related Art

In recent years, physical unclonable function (PUF) is widely used in security product applications for security purposes. The physical unclonable function is a program that may be used to create a unique random key for a physical entity (such as an integrated circuit). In general, the physical unclonable functional technique utilizes manufacturing variations of semiconductor chips to obtain unique random code. Even with a precise process step, a semiconductor chip may be fabricated, but the random code is almost impossible to copy. Therefore, the security is high. Highly reliable physical unclonable function is especially needed when used in conjunction with a cryptographic hash module for generating the random keys.

However, in the prior art, a set of physical unclonable function codes obtained through actual manufacturing variations of circuit layouts may have a problem of insufficient randomness, and a formation ratio thereof is obviously biased towards a specific logical level, thereby reducing security.

SUMMARY

The disclosure provides a physical unclonable function (PUF) code generating method and a providing apparatus thereof, which can provide a highly random physical unclonable function code.

The physical unclonable function code generating method of the disclosure includes: providing a plurality of non-volatile memory cell pairs, each of the non-volatile memory cell pairs includes a first non-volatile memory cell and a second non-volatile memory cell; comparing an initial state of the first non-volatile memory cell with an initial state of the second non-volatile memory cell of each non-volatile memory cell pair, and generating a set of first physical unclonable function codes according to a state comparison result; calculating a formation ratio difference of a logical level in the first physical unclonable function codes; and when the formation ratio difference is greater than or equal to a ratio threshold, adjusting the formation ratio difference by interactively performing a forming operation on the first non-volatile memory cell and the second non-volatile memory cell of each non-volatile memory cell pair, and repeatedly adjusting until the formation ratio difference is less than the ratio threshold.

In an embodiment of the disclosure, after the step of adjusting the formation ratio difference, further including: generating a set of second physical unclonable function codes according to a state comparison result of the first non-volatile memory cell and the second non-volatile memory cell of each non-volatile memory cell pair after adjusting the formation ratio difference; and performing a heavy forming operation or a heavy reset operation on the first non-volatile memory cell and the second non-volatile memory cell of each non-volatile memory cell pair to fix the set of second physical unclonable code generated.

The physical unclonable function code providing apparatus of the disclosure includes a plurality of non-volatile memory cell pairs, a sensing circuit, and a controller. Each non-volatile memory cell pair includes a first non-volatile memory cell and a second non-volatile memory cell. The sensing circuit is coupled to the non-volatile memory cell pairs, and compares the initial state of the first non-volatile memory cell with the initial state of the second non-volatile memory cell of each non-volatile memory cell pair, and generates a set of first physical unclonable function codes according to a state comparison result. The controller is coupled to the non-volatile memory cell pairs and the sensing circuit, and calculates a formation difference ratio of a logical level in the first physical unclonable function codes. When the formation ratio difference is greater than or equal to the ratio threshold, the controller adjusts the formation ratio difference by interactively performing a forming operation on the first non-volatile memory cell and the second non-volatile memory cell of each non-volatile memory cell pair, and repeats adjusting until the formation ratio difference is less than the ratio threshold.

Based on the above, in an exemplary embodiment of the disclosure, after an initial physical unclonable function code is generated, the formation ratio of the physical unclonable function code may be further calibrated by performing the forming operation to generate a highly random unique physical unclonable function code. Thereafter, it can be fixed by performing the heavy forming operation or the heavy reset operation to amplify the read margin, increasing reliability and security.

To make the above features and advantages of the disclosure more apparent and comprehensible, several embodiments accompanied with drawings are described in detail as follows.

DESCRIPTION OF THE EMBODIMENTS

Figure 1:
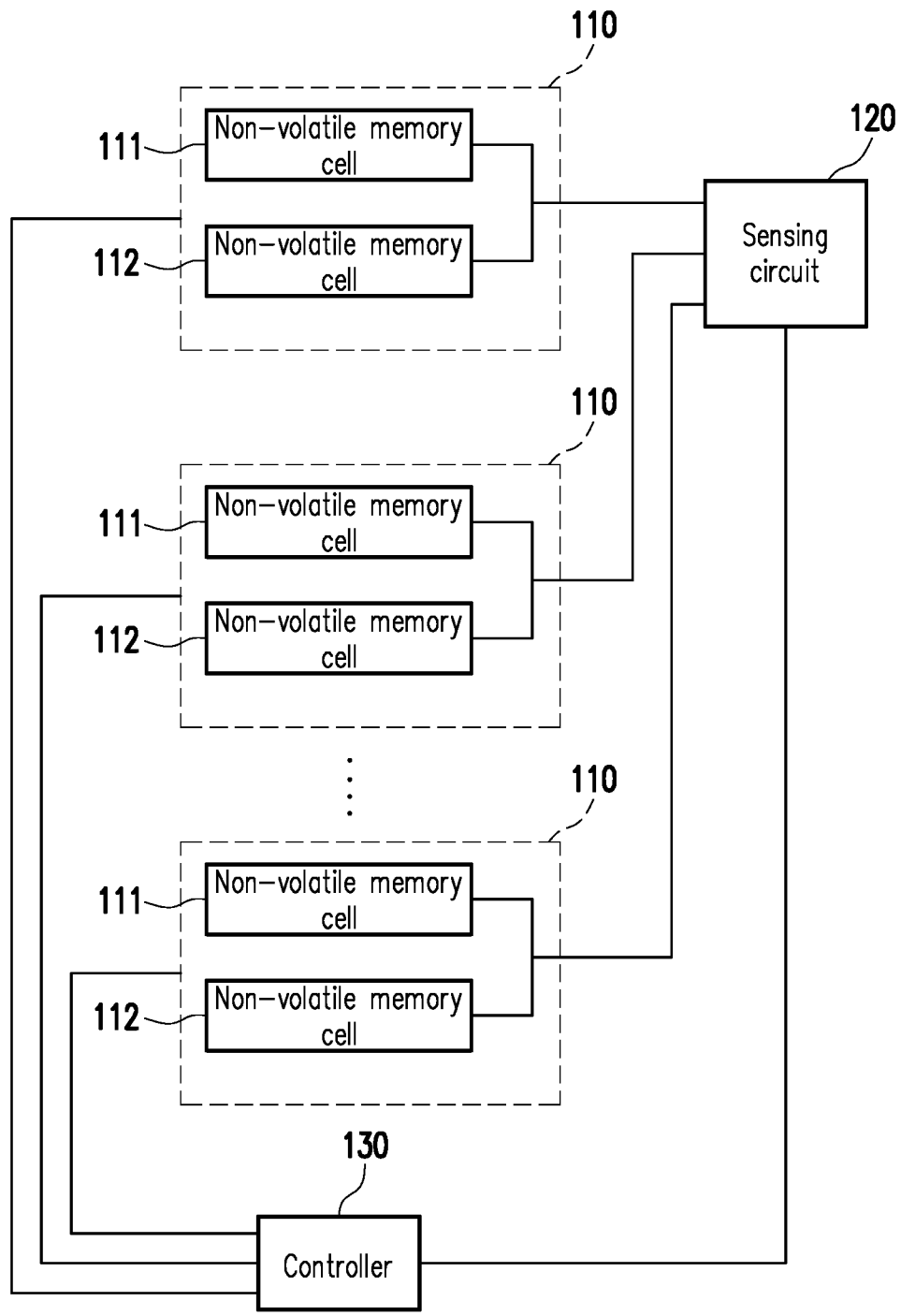
FIG. 1 is a physical unclonable function (PUF) code providing apparatus according to an embodiment of the disclosure.

Referring to FIG. 1, FIG. 1 is a physical unclonable function (PUF) code providing apparatus according to an embodiment of the disclosure. A physical unclonable function code providing apparatus 100 includes a plurality of non-volatile memory cell pairs 110, a sensing circuit 120, and a controller 130. Each non-volatile memory cell pair 110 includes two non-volatile memory cells 111 and 112. The non-volatile memory cells 111 and 112 are coupled to the sensing circuit 120. The non-volatile memory cells 111 and 112 respectively provide respective initial states to the sensing circuit 120, and the sensing circuit 120 compares an initial state of the non-volatile memory cell 111 with an initial state of the non-volatile memory cell 112 of each non-volatile memory cell pair 110, and generates a set of first physical unclonable function codes (hereinafter referred to as original physical unclonable function codes) according to the state comparison result of each non-volatile memory cell pair 110.

For example, the initial state of the non-volatile memory cells 111 and 112 are a first initial resistance value and a second initial resistance value. The sensing circuit 120 may sense the first initial resistance value by providing a first sensing current or a first sensing voltage to the non-volatile memory cell 111, and may provide a second sensing current or a second sensing voltage to the non-volatile memory cell 112 to sense the second initial resistance value. For one non-volatile memory cell pair 110, if the first initial resistance value is less than the second initial resistance value, the sensing circuit 120 may generate a single physical unclonable function code that is the same as a first logical level (e.g., 0), and if the first initial resistance value is greater than the second initial resistance value, the sensing circuit 120 may generate a single physical unclonable function code that is the same as a second logical level (e.g., 1). The first logical level is complementary to the second logical level. The sensing circuit 120 combines the single physical unclonable function code generated by each non-volatile memory cell pair 110 to generate a set of original physical unclonable function codes, the number of bits is equal to the number of non-volatile memory cell pairs 110. In the embodiment, each of the non-volatile memory cells 111 and 112 may be, for example, a resistive random-access memory (ReRAM) cell.

The sensing circuit 120 may be, for example, a sense amplifier of a memory. A hardware structure of the sensing circuit 120 may be implemented by a sense amplifier well known to those skilled in the art, and the disclosure is not limited thereto.

Figure 2:
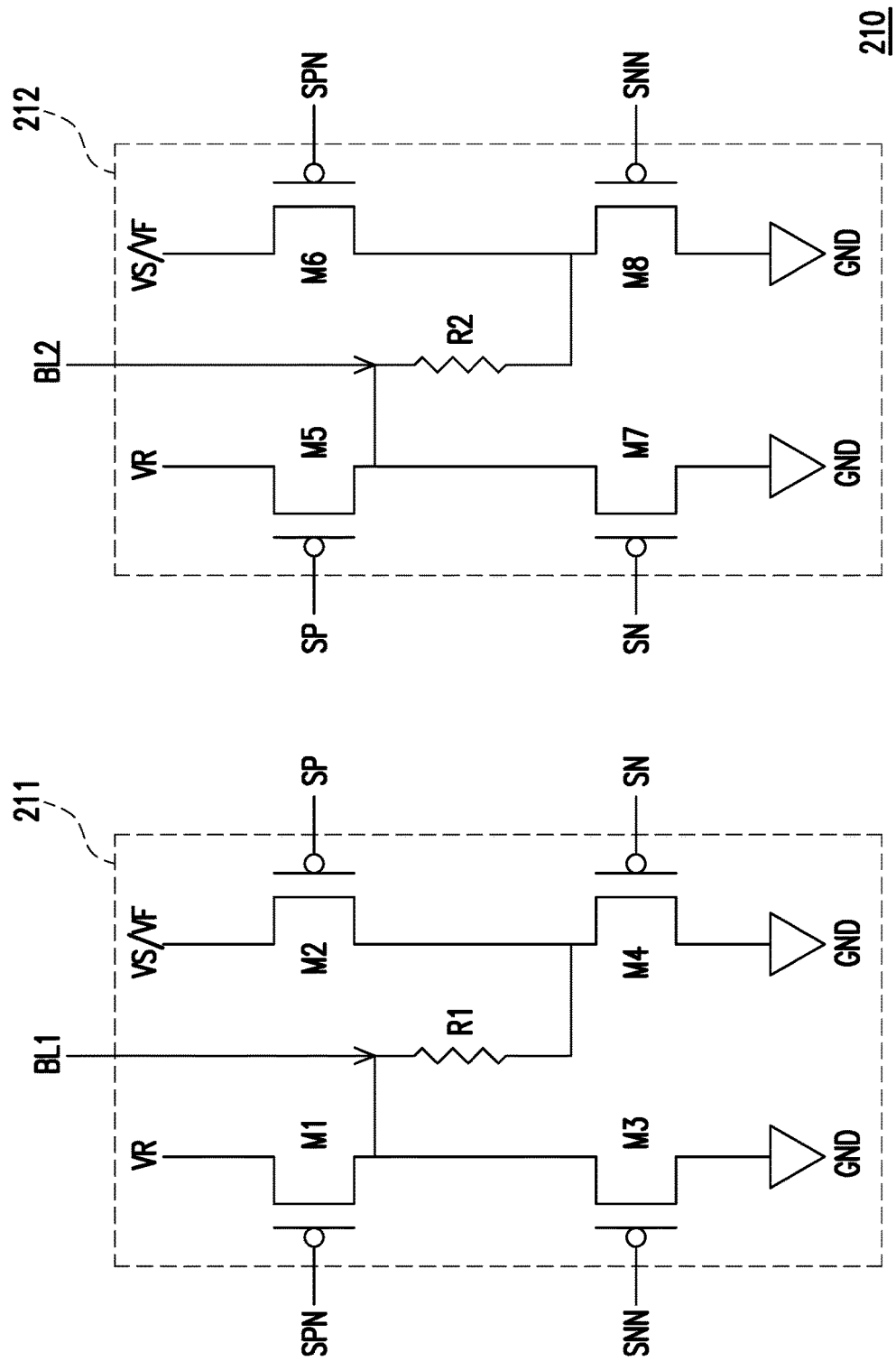
FIG. 2 is a non-volatile memory cell pair according to an embodiment of the disclosure.

The following is an example of the structure of a non-volatile memory cell pair that is implemented in an embodiment of the disclosure. Please refer to FIG. 2. FIG. 2 is a non-volatile memory cell pair according to an embodiment of the disclosure. In FIG. 2, a non-volatile memory cell pair 210 includes two non-volatile memory cells 211 and 212. The non-volatile memory cell 211 includes transistors M1 to M4 and a resistor R1, and the non-volatile memory cell 212 includes transistors M5 to M8 and a resistor R2. The transistor M1 may receive a reset voltage VR and is controlled by a control signal SPN. The transistor M3 is coupled between the transistor M1 and the ground end GND and is controlled by a control signal SNN. The transistor M2 receives a set voltage VS (or forming voltage VF) and is controlled by a control signal SP. The transistor M4 is coupled between the transistor M2 and the ground end GDN and is controlled by a control signal SN. The resistor R1 is coupled to a bit line BL1 and coupled between the transistor M1 and the transistor M4.

The transistor M5 receives the reset voltage VR and is controlled by the control signal SP. The transistor M7 is coupled between the transistor M5 and the ground end GND and is controlled by the control signal SN. The transistor M6 receives the reset voltage VR and is controlled by the control signal SPN. The transistor M8 is coupled between the transistor M6 and the ground end GND and is controlled by the control signal SNN. The resistor R2 is coupled to a bit line BL2 and coupled between the transistor M5 and the transistor M8.

Take the non-volatile memory cell 211 as an example. If a set operation (or a forming operation) is performed on the non-volatile memory cell 211, the transistors M2 and M3 are turned on, the transistors M1 and M4 are turned off, and the set voltage VS (or forming voltage VF) may be applied to the resistor R1 via the transistor M2 and the transistor M3. A resistance value of resistor R1 can be set (or formed). If a reset operation is performed on the non-volatile memory cell 211, the transistors M1 and M4 are turned on, the transistors M2 and M3 are turned off, and the reset voltage VR may be applied to the resistor R1 via the transistor M1 and the transistor M4. The resistance value of resistor R1 may be reset.

If a set prohibit operation (or a forming prohibit operation) is perform on the non-volatile memory cell 211, the transistors M1 and M4 are turned on, the transistors M2 and M3 are turned off, and the reset voltage VR may be pulled down to 0V. The resistor R1 is prohibited from being set (or formed). If a reset prohibit operation is performed on the non-volatile memory cell 211, the transistors M2 and M3 are turned on, the transistors M1 and M4 are turned off, and the voltage VS (or forming voltage VF) may be pulled down to 0V. The resistor R1 is prohibited to be reset.

On the other hand, if a reading operation is performed on the non-volatile memory cell 211, the set voltage VS (or forming voltage VF) and the reset voltage VR are pulled down to 0V, the transistors M1, M2, and M3 are turned off, and the transistor M4 is turned on. A resistance value of the resistor R1 may be read through the bit line BL1.

In the above embodiment, the non-volatile memory cell pair 210 is a structure having eight transistors eight resistors (8T2R). However, the disclosure is not limited thereto. In other embodiments, for example, a structure such as two transistors two resistors (2T2R) may be used, and embodiments thereof may be sufficiently taught, suggested, and implemented by the general knowledge in the technical field.

Referring back to FIG. 1, the controller 130 is, for example, a central processing unit (CPU), or other programmable general purpose or special purpose microprocessor, digital signal processor (DSP), programmable controller, application specific integrated circuit (ASIC), programmable logic device (PLD) or other similar device or a combination of these devices. The controller 130 is coupled to each of the non-volatile memory cell pairs 110 and the sensing circuit 120. The controller 130 calculates a formation ratio difference of the logical level in the set of original physical unclonable function codes generated by the sensing circuit 120, that is, the formation ratio difference between the physical unclonable function codes of the first logical level and the physical unclonable function codes of the second logical level in the set of original physical unclonable function codes, so as to calibrates the physical unclonable function code. Please refer to the following for detailed calibration steps.

Figure 3:
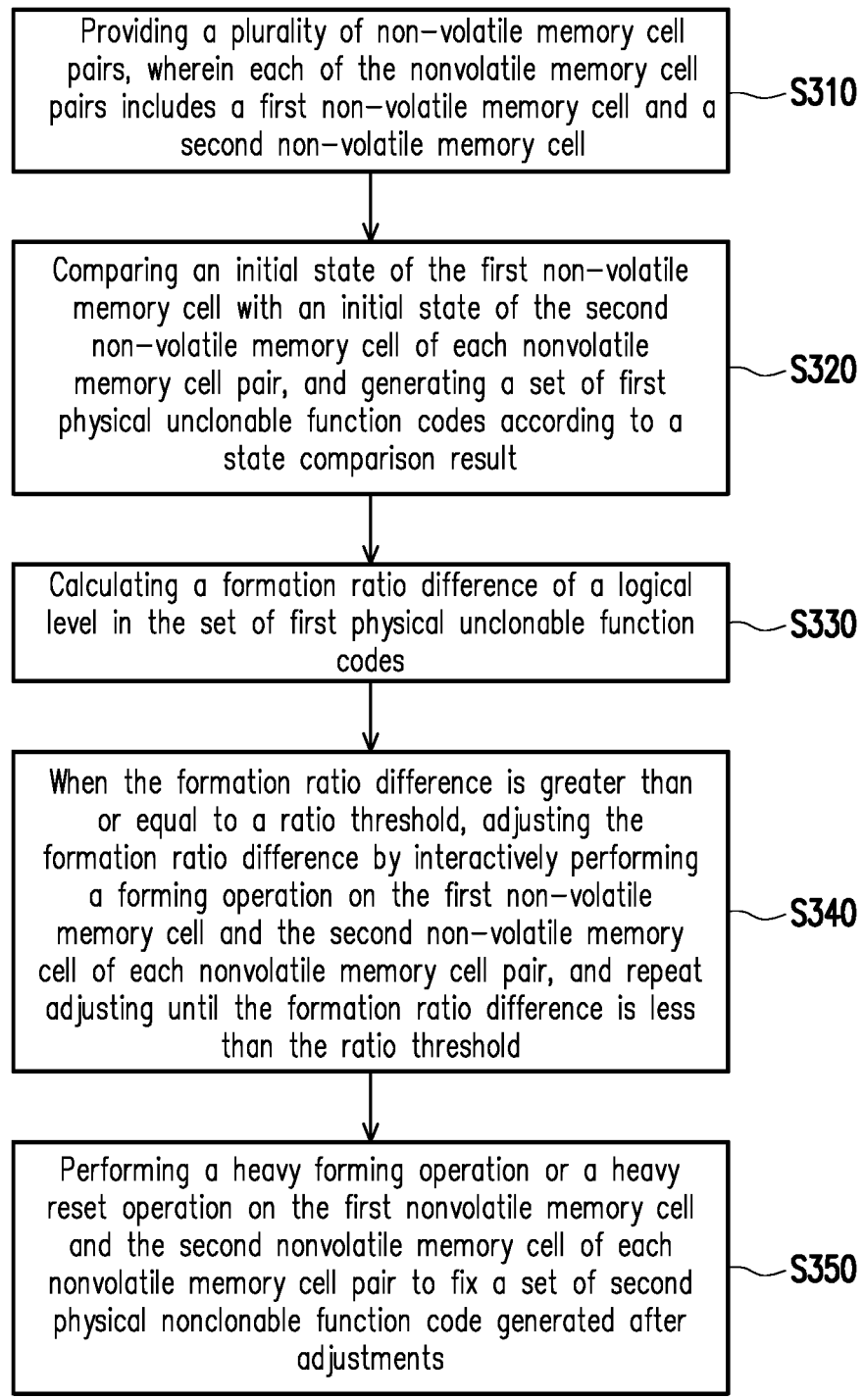
FIG. 3 is a flowchart showing the steps of a physical unclonable function code generating method according to an embodiment of the disclosure.

FIG. 3 is a flowchart of a physical unclonable function code generating method according to an embodiment of the disclosure. Referring to FIG. 1 and FIG. 3 together, the physical unclonable function code generating method of the embodiment is applicable to the physical unclonable function code providing apparatus 100 of FIG. 1, and the following with various elements in FIG. 1 describe the steps for the physical unclonable function code generating method of the disclosure.

In the embodiment, in step S310, the physical unclonable function code providing apparatus 100 provides a plurality of non-volatile memory cell pairs 110. Herein each of the non-volatile memory cell pairs 110 includes a non-volatile memory cell 111 and a non-volatile memory cell 112.

Next, in step S320, the sensing circuit 120 compares an initial state of the non-volatile memory cell 111 with an initial state of the non-volatile memory cell 112 of each non-volatile memory cell pair 110, and generates a set of original physical unclonable function code according to a state comparison result. An initial state of the volatile memory cell 111 is, for example, a first initial resistance value, and the initial state of the non-volatile memory cell 112 is, for example, a second initial resistance value. Specifically, the sensing circuit 120 may sense the first and second initial resistance values in each non-volatile memory cell pair 110, and generates the set of original physical unclonable function codes according to a difference value between the first and second initial resistance values in each non-volatile memory cell pair 110. For example, comparing the first and second initial resistance values of each non-volatile memory cell pair, if the first initial resistance value is less than the second initial resistance value, the sensing circuit 120 may generate a single physical unclonable function code that is the same as the first logical level (e.g., 0). If the first initial resistance value is greater than the second initial resistance value, the sensing circuit 120 may generate a single physical unclonable function code that is the same as the second logical level (e.g., 1). Thereafter, all of the generated physical unclonable function codes are combined to generate the set of original physical unclonable function codes.

Next, the controller 130 obtains the set of original physical unclonable function codes from the sensing circuit 120, and in step S330, calculates a formation ratio difference of the logical level in the set of original physical unclonable function codes. Specifically, the controller 130 respectively calculates a first ratio (for example, a ratio of 0) occupied by the physical unclonable function codes of the first logical level and a second ratio (for example, a ratio of 1) occupied by the physical unclonable function codes of the second logical level in the set of original physical unclonable function codes. And, the controller 130 subtracts the first ratio from the second ratio and takes an absolute value to generate the formation ratio difference.

Then, in step S340, when the formation ratio difference is greater than or equal to the ratio threshold, the controller 130 adjusts the formation ratio difference by interactively performing a forming operation on the non-volatile memory cell 111 and the non-volatile memory cell 112 of each non-volatile memory cell pair 110, and repeat adjusting until the formation ratio difference is less than the ratio threshold. Detailed adjustment steps of the formation ratio difference may be referred to each respective steps in FIG. 4.

Figure 4:
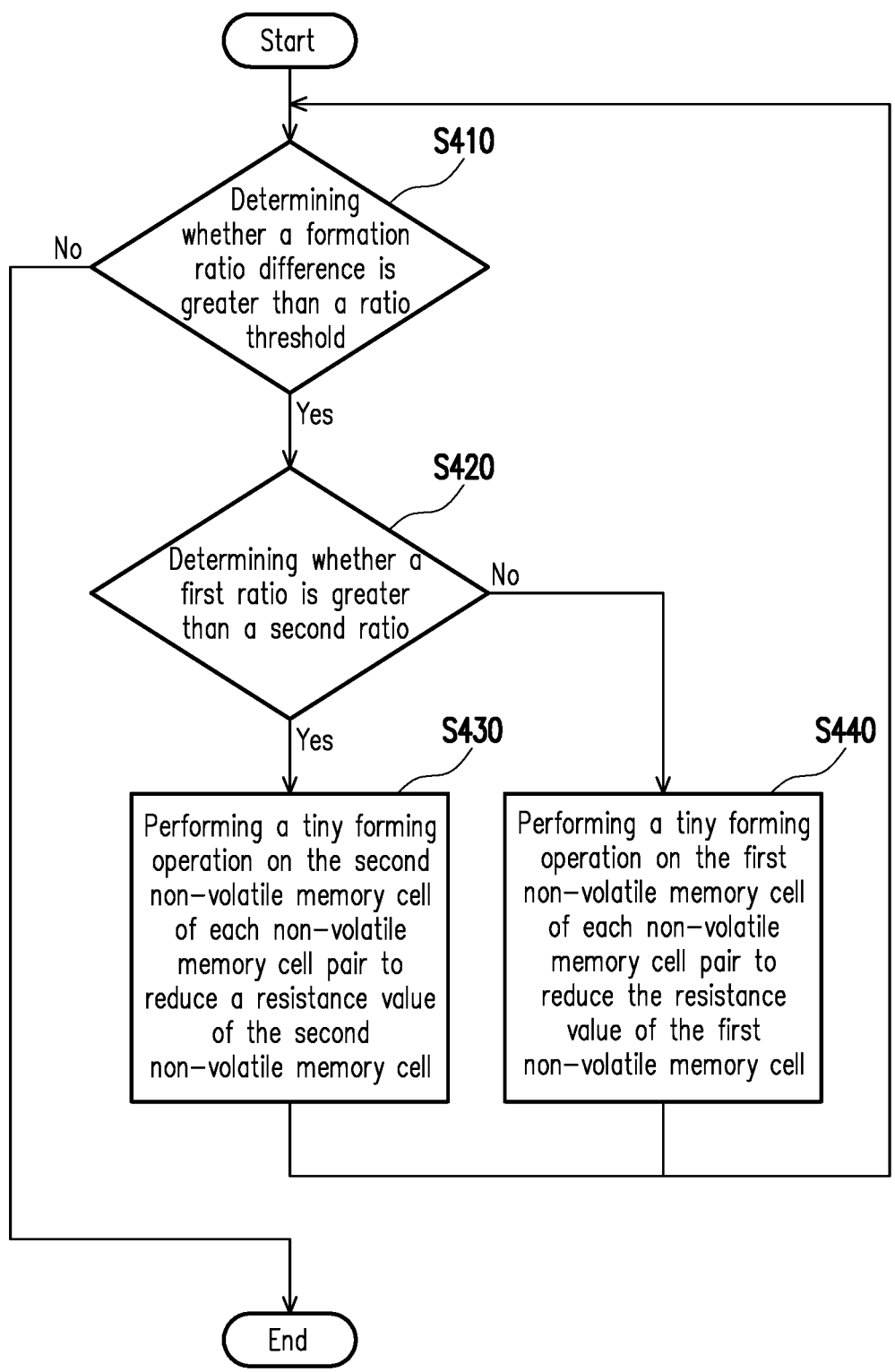
FIG. 4 is a flowchart showing the steps of a physical unclonable function code generating method according to an embodiment of the disclosure.

FIG. 4 is a flowchart of a physical unclonable function code generating method according to an embodiment of the disclosure. In the embodiment, the forming operation is, for example, a tiny forming operation. In step S410, the controller 130 determines whether the formation ratio difference of the logical level in the set of original physical unclonable function codes is greater than or equal to the ratio threshold. Wherein, if the controller 130 determines that the formation ratio difference is greater than or equal to the ratio threshold, the controller 130 may then determine in step S420 whether the first ratio (e.g., the ratio of 0) is greater than the second ratio (e.g., the ratio of 1). If the controller 130 determines that the formation ratio difference is not greater than or equal to the ratio threshold, the step of adjusting the formation ratio difference described in FIG. 4 is directly ended. In the embodiment, the ratio threshold is, for example, in a range of five percent (5%) to ten percent (10%), but the disclosure is not limited thereto.

If the controller 130 determines that the first ratio is greater than the second ratio, in step S430, the controller 130 performs the tiny forming operation on the non-volatile memory cell 112 of each non-volatile memory cell pair 110 to reduce the resistance value of the non-volatile memory cell 112. On the other hand, if the controller 130 determines that the first ratio is not greater than the second ratio, in step S440, the controller 130 performs the tiny forming operation on the non-volatile memory cell 111 of each non-volatile memory cell pair 110 to reduce the resistance value of the non-volatile memory cell 111. After the step S430 or S440 is ended, the process returns to step S410 to determine whether the adjusted formation ratio difference is in compliance with regulations.

It should be noted that, as shown in FIG. 4, in the embodiment, the tiny forming operation may be repeatedly performed to adjust the formation ratio difference until it is less than the ratio threshold, but the disclosure is not limited thereto. In another embodiment, an upper limit value of the number of adjustments may also be set. When a number of times the tiny forming operation is performed reaches the upper limit value, the step of adjusting the formation ratio difference described in FIG. 4 is directly ended.

Herein, the tiny forming operation of the embodiment will be explained. After a normal non-volatile memory cell is subjected to a normal forming operation, a normal set operation or a normal reset operation may be performed to change the resistance state of the non-volatile memory cell, thereby being represented as a first logical level (for example, 0) or a second logical level (for example, 1). When the normal forming operation is performed, for example, a voltage of 1.5 to 2.5 volts is applied to a gate of the non-volatile memory cell (i.e., a gate voltage is 1.5V to 2.5V), and a voltage of 3 to 5 volts is applied to a bit line coupled thereto (that is, a bit line voltage is 3V~5V), and a source line voltage may be 0V. However, compared to the normal forming operation, in the tiny forming operation of the embodiment, the controller 130 applies a relatively smaller voltage to the non-volatile memory cell, for example, the gate voltage is set to 1V to 1.3V, and the bit line voltage is set to 2.5V~3.5V. The source line voltage is also 0V. If the normal forming operation is used to perform a calibration of the physical unclonable function code, the voltage used will be too strong, and the current of the non-volatile memory cell 111 and the non-volatile memory cell 112 of each non-volatile memory cell cannot be fine-tuned. Once the forming operation is over-executed (the current is too large), the result is not reversible, resulting in a calibration failure, and the physical unclonable function code is ineffective. Conversely, in the embodiment, the tiny forming operation is used instead of the normal forming operation, and the currents of the non-volatile memory cell 111 and the non-volatile memory cell 112 of each non-volatile memory cell pair 110 may be easily fine-tuned to avoid the danger of over-current (the current is too large).

In addition, there are two methods for determining normal forming and tiny forming: (1) high temperature baking, (2) electrical verification (identification).

For (1) high temperature baking, if it is a normal forming operation, the current read from a memory cell after high temperature baking will be slightly reduced, for example, the original current is 10 uA-18 uA, and may be reduced to 5 uA-15 uA after baking at high temperature. On the other hand, if it is a tiny forming operation, most of the current read from the memory cell after baking at a high temperature is reduce to an even lower level, for example, the original current is 3 uA to 15 uA, and may be reduced to 0 uA to 5 uA after baking at high temperature, and a filament path of most memory cells may disappear, that is, return to an intrinsic resistance state of 0 uA.

For (2) electrical verification (identification), after a memory cell performed by normal forming operation goes through a first reset operation plus the set operation, a set read current of the low resistance state (LRS) memory cells will be pushed higher. For example, pushed from 10 uA~18 uA to 20 uA~30 uA. In contrast, after the memory cell performed by the tiny forming operation goes through the same process, the set read current of the memory cell may only be pushed from 3 uA~15 uA to 5 uA~18 uA, and cannot be pushed further.

After the formation ratio difference adjusting is completed, the sensing circuit 120 may generate a set of second physical unclonable function codes according to the state comparison result of the non-volatile memory cell 111 and the non-volatile memory cell 112 of each non-volatile memory cell pair 110 after adjusting the formation ratio difference (hereinafter referred to as a calibrated physical unclonable function codes).

Returning to FIG. 3, finally, in step S350, the controller 130 performs a heavy forming operation or a heavy reset operation on the non-volatile memory cell 111 and the non-volatile memory cell 112 of each non-volatile memory cell pair 110 to fix the set of calibrated physical unclonable function code generated after adjustments.

Specifically, for the non-volatile memory cell pairs 110 of the physical unclonable function code that generates the first logical level in the set of calibrated physical unclonable function code, the controller 130 further performs a heavy forming operation on the non-volatile memory cell 111 thereof, and performs a heavy reset operation on the non-volatile memory cell 112. The difference between the resistance values of the non-volatile memory cells 111 and 112 may be amplified. In this case, the read margin of the physical unclonable function code providing apparatus 100 may be amplified, thereby improving its high temperature data retention (HTDR) capability and endurance.

On the other hand, for the non-volatile memory cell pairs 110 of the physical unclonable function code that generates the second logical level in the set of calibrated physical unclonable function code, the controller 130 further performs the heavy reset operation on the non-volatile memory cell 111, and performs a heavy forming operation on the non-volatile memory cell 112. Similarly, the difference between the resistance values of the non-volatile memory cells 111 and 112 may be amplified. In this case, the read margin of the physical unclonable function code providing apparatus 100 may be amplified, thereby improving its high temperature data retention capability and endurance.

Herein, compared to the normal forming operation and the normal reset operation, in this embodiment, the controller 130 applies a relatively large voltage to the non-volatile memory cell in the heavy forming operation, for example, the gate voltage is set to about 4V~6V, the bit line voltage is set to approximately 4V~6V and the source line voltage is set to 0V. The controller 130 applies a relatively large reset voltage to the non-volatile memory cell during the heavy reset operation, for example, the gate voltage is set to about 4V~6V, the bit line voltage is set to 0V, and the source line voltage is set to 4V~6V.

The above steps S310~S340 (including steps S410~S440) may be regarded as a calibration program of the physical unclonable function code of the embodiment. The above step S350 may be regarded as a solid writing program of the physical unclonable function code of the embodiment. In addition, the above calibration program and solid writing program may be automatically executed, for example, after a chip is first powered up, to automatically generate the calibrated physical unclonable function code with a uniform logical level.

In summary, the disclosure provides a physical unclonable function code generating method and a providing apparatus thereof, which the physical unclonable functions code may be calibrated by performing the forming operation on two memory cells in a memory cell pair after generating an initial physical unclonable function codes to improve its randomness. Thereafter, the physical unclonable function codes may be fixed by performing the heavy forming operation or the heavy reset operation to amplify the read margin, thereby increasing reliability and security.

Although the disclosure has been described above in terms of embodiment, it is not intended to limit the disclosure, and it is intended to be a matter of ordinary skill in the art without departing from the spirit and scope of the disclosure. The scope of the disclosure is defined by the scope of the appended claims.

What is claimed is:

1. A physical unclonable function (PUF) code generating method comprising:
providing a plurality of non-volatile memory cell pairs, wherein each of the non-volatile memory cell pairs comprises a first non-volatile memory cell and a second non-volatile memory cell;
comparing an initial state of the first non-volatile memory cell with an initial state of the second non-volatile memory cell of each non-volatile memory cell pair, and generating a set of first physical unclonable function codes according to a state comparison result;
calculating a formation ratio difference of a logical level in the set of first physical unclonable function codes;
when the formation ratio difference is greater than or equal to a ratio threshold, adjusting the formation ratio difference by interactively performing a forming operation on the first non-volatile memory cell and the second non-volatile memory cell of each of the non-volatile memory cell pairs, and repeatedly adjusting until the formation ratio difference is less than the ratio threshold.

2. The physical unclonable function code generating method as claimed in claim 1, wherein the initial state of the first non-volatile memory cell is a first initial resistance value, the initial state of the second non-volatile memory cell is a second initial resistance value, and the step of comparing the initial state of the first non-volatile memory cell with the initial state of the second non-volatile memory cell of each of the non-volatile memory cell pairs, and generating the set of first physical unclonable function codes according to the state comparison result comprises:
sensing the first and the second initial resistance values in each of the non-volatile memory cell pairs;
comparing the first and the second initial resistance values in each of the non-volatile memory cell pairs;
for each non-volatile memory cell pair, if the first initial resistance value is less than the second initial resistance value, generating a single physical unclonable function code of a first logical level, if the first initial resistance value is greater than the second initial resistance value, generating a single physical unclonable function code of a second logical level;
combining the generated single physical unclonable function codes to form the set of first physical unclonable function codes.

3. The physical unclonable function code generating method as claimed in claim 2, wherein the step of calculating the formation ratio difference of the logical level in the set of first physical unclonable function codes comprises:
respectively calculating a first ratio occupied by the first physical unclonable function code of the first logical level and a second ratio occupied by the physical unclonable function code of the second logical level in the set of first physical unclonable function codes; and
generating the formation ratio difference by obtaining an absolute value after subtracting the first ratio from the second ratio.

4. The physical unclonable function code generating method as claimed in claim 3, wherein the forming operation is a tiny forming operation, and the step of adjusting the formation ratio difference by interactively performing the forming operation on the first non-volatile memory cell and the second non-volatile memory cell of each non-volatile memory cell pair comprises:
determining whether the formation ratio difference is greater than or equal to the ratio threshold;
when the formation ratio difference is greater than or equal to the ratio threshold value, determining whether the first ratio is greater than the second ratio;
when the first ratio is greater than the second ratio, performing the tiny forming operation on the second non-volatile memory cell to reduce the resistance value of the second non-volatile memory cell; and
when the first ratio is not greater than the second ratio, performing the tiny forming operation on the first non-volatile memory cell to reduce the resistance value of the first non-volatile memory cell.

5. The physical unclonable function code generating method as claimed in claim 1, wherein after the step of adjusting the formation ratio difference, further comprising:
generating a set of second physical unclonable function codes according to a state comparison result of the first non-volatile memory cell and the second non-volatile memory cell of each non-volatile memory cell pair after adjusting the formation ratio difference; and
performing a heavy forming operation or a heavy reset operation on the first non-volatile memory cell and the second non-volatile memory cell of each non-volatile memory cell pair to fix the set of second physical unclonable function codes generated.

6. The physical unclonable function code generating method as claimed in claim 5, wherein the step of performing the heavy forming operation or the heavy reset operation on the first non-volatile memory cell and the second non-volatile memory cell of each non-volatile memory cell pair to fix the set of second physical unclonable function codes generated comprises:
for the non-volatile memory cell pairs that generate the physical unclonable function code of a first logical level in the set of second physical unclonable function codes, performing the heavy forming operation on the first non-volatile memory cell, and performing the heavy reset operation on the second non-volatile memory cell; and
for the non-volatile memory cell pairs that generate the physical unclonable function code of a second logical level in the set of second physical unclonable function codes, performing the heavy reset operation on the first non-volatile memory cell, and performing the heavy forming operation on the second non-volatile memory cell.

7. A physical unclonable function (PUF) code providing apparatus comprises:
a plurality of non-volatile memory cell pairs, each of the non-volatile memory cell pairs comprises a first non-volatile memory cell and a second non-volatile memory cell;
a sensing circuit, coupled to the non-volatile memory cell pairs, compares an initial state of the first non-volatile memory cell with an initial state of the second non-volatile memory cell of each non-volatile memory cell pair, and generates a set of first physical unclonable function codes according to a state comparison result; and
a controller, coupled to the non-volatile memory cell pairs and the sensing circuit, calculates a formation ratio difference of a logical level in the set of first physical unclonable function codes, and when the formation ratio difference is greater than or equal to a ratio threshold, the controller adjusts the formation ratio difference by interactively performing a forming operation on the first non-volatile memory cell and the second non-volatile memory cell of each of the non-volatile memory cell pairs, and repeats adjusting until the formation ratio difference is less than the ratio threshold.

8. The physical unclonable function (PUF) code providing apparatus as claimed in claim 7, wherein the initial state of the first non-volatile memory cell is a first initial resistance value, the initial state of the second non-volatile memory cell is a second initial resistance value, and the sensing circuit senses the first and the second initial resistance values in each of the non-volatile memory cell pairs, and compares the first and the second initial resistance values in each of the non-volatile memory cell pairs,
for each of the non-volatile memory cell pairs, if the first initial resistance value is less than the second initial resistance value, the sensing circuit generates a single physical unclonable function code of a first logical level, if the first initial resistance value is greater than the second initial resistance value, the sensing circuit generates a single physical unclonable function code of a second logical level, and the sensing circuit combines the generated single physical unclonable function codes to form the set of first physical unclonable function codes.

9. The physical unclonable function (PUF) code providing apparatus as claimed in claim 8, wherein the controller respectively calculates a first ratio occupied by the physical unclonable function codes of the first logical level and a second ratio occupied by the physical unclonable function codes of the second logical level in the set of first physical unclonable function codes, and generates the formation ratio difference by obtaining an absolute value after subtracting the first ratio from the second ratio.

10. The physical unclonable function (PUF) code providing apparatus as claimed in claim 9, wherein the forming operation is a tiny forming operation, and the controller determines whether the formation ratio difference is greater than or equal to the ratio threshold, when the formation ratio difference is greater than or equal to the ratio threshold, the controller determines whether the first ratio is greater than the second ratio,
when the first ratio is greater than the second ratio, the controller performs the tiny forming operation on the second non-volatile memory cell to reduce the resistance value of the second non-volatile memory cell, when the first ratio is not greater than the second ratio, the controller performs the tiny forming operation on the first non-volatile memory cell to reduce the resistance value of the first non-volatile memory cell.

11. The physical unclonable function (PUF) code providing apparatus as claimed in claim 7, wherein after the formation ratio difference adjustment is completed, the sensing circuit generates a set of second physical unclonable function codes according to a state comparison result of the first non-volatile memory cell and the second non-volatile memory cell of each non-volatile memory cell pair after adjusting the formation ratio difference, the controller performs a heavy forming operation or a heavy reset operation on the first non-volatile memory cell and the second non-volatile memory cell of each non-volatile memory cell pair to fix the set of second physical unclonable function codes generated by the sensing circuit.

12. The physical unclonable function (PUF) code providing apparatus as claimed in claim 11, wherein for the non-volatile memory cell pairs that generates the physical unclonable function code of a first logical level in the set of second physical unclonable function codes, the controller performs the heavy forming operation on the first non-volatile memory cell, the controller performs the heavy reset operation on the second non-volatile memory cell, for the non-volatile memory cell pairs that generates the physical unclonable function code of a second logical level in the set of second physical unclonable function codes, the controller performs the heavy reset operation on the first non-volatile memory cell, and the controller performs the heavy forming operation on the second non-volatile memory cell.

* * * * *